Inventor:
Hans Mueller
By Michael S. Shiker
Attorney

United States Patent Office 3,398,832
Patented Aug. 27, 1968

3,398,832
FILTER DEVICE
Hans Mueller, Erlenbach, Zurich, Switzerland
Continuation-in-part of application Ser. No. 427,022,
Jan. 21, 1965. This application Aug. 15, 1967, Ser.
No. 660,763
Claims priority, application Germany, Jan. 22, 1964,
M 47,126
8 Claims. (Cl. 210—284)

ABSTRACT OF THE DISCLOSURE

A rotatable shaft carries a transversely extending plate. A perforate supporting member overlies the upper surface of the plate and carries in turn a layer of particulate filtering material. Connecting means in form of an annular element connects the plate and the supporting member together at their edges and also confines the particulate filtering material but permits centrifugal ejection thereof, and of solid fraction retained therein, in response to rotation of the shaft.

Cross-reference to related application

A related application was filed in the name of Hans Mueller on Jan. 21, 1965, under the title, "Filter Device," and is copending under Ser. No. 427,022, now Patent No. 3,356,219. The present application is a continuation-in-part of this copending application.

Background of the invention

The present invention relates generally to a filter device, and more particularly to a rotary-element filter device. Still more specifically, the present invention relates to a filter device of the type in which the ejection of a layer of particulate filtering material, and of solid residue entrapped therein, from the filter element is effected centrifugally by rotating the element.

Filters of the type using a layer of particulate filtering material are generally known as alluvial filters. In this type of filter it is known, for instance from my above-mentioned copending application, to mount a substantially disc-shaped base plate on a rotatable shaft, and to provide a perforate supporting member, e.g. a filter screen, which overlies the upper surface of the base plate and is secured thereto inwardly of the peripheral edge portion of the base plate. The layer of particulate filtering material, which for such applications as the filtration of beer and the like must be on the order of 3 or 4 cm. thick, is carried on top of the supporting member. The liquid to be filtered is passed through this layer with the solid fraction being retained therein as residue, and the filtrate running off between the supporting member and the base plate. Details of how this is accomplished are set forth in my above-mentioned copending application and need not be further explained here.

It is clear that passage of the liquid through the layer of particulate filtering material will tend to destroy this layer by causing quantities of the material to be washed over the edge of the base plate. This is not tolerable because it adversely affects proper filtration. To prevent this it is known from my copending application to have the peripheral edge portion of the base plate extend radially beyond the line at which the edge of the supporting member is secured to the base plate. This projecting edge portion of the base plate is formed to extend not only radially, but also to extend upwardly above the supporting member. In order to make possible the desired centrifugal ejection of the particulate material the edge portion is provided with an inner face which not only diverges upwardly but also radially outwardly so that the filtering material can slide over this face and be radially outwardly ejected when it is under the influence of centrifugal force.

This type of filter has been found to be very effective. However, it requires that the perforate supporting member be permanently joined to the base plate. Thus, it cannot find use in an application where it is desirable or even unavoidable that the supporting member be removable from the base plate, either for cleaning or repair purposes, or for exchange against a perforate supporting member having perforations of different size.

Summary of the invention

The present invention provides a filter device usable for such applications.

More particularly, the present invention provides a filter device of the type generally outlined whose supporting member is releasable from the base plate, which fact does not, however, affect the retention of the particulate filtering material or its centrifugal ejection.

In accordance with one feature of my invention I provide a filter device of the type generally outlined above. Such device includes a rotatable shaft which carries for rotation therewith a base plate whose upper surface extends transversely of the shaft and which is provided with a peripheral edge. A perforate supporting member—such as a filter screen or the like—overlies this upper surface and also has a peripheral edge. A layer of particulate filter material which, as mentioned earlier, may have a thickness on the order to 3 or 4 cm., is carried by the supporting member.

Thus far the construction of the filter device is known. In accordance with my invention I further provide, however, connecting means which extends circumferentially of the base plate and the supporting member and which releasably connects the peripheral edge of the one to the peripheral edge of the other, while at the same time being operative for confining the particulate filtering material during filtration of liquid therethrough but permitting automatic centrifugal ejection of the particulate material—and of solid residue or fraction entrapped therein—in response to rotation of the shaft.

The novel features which are considered as characteristic for the invention are set forth in particular in the appended claims. The invention itself, however, both as to its construction and its method of operation, together with additional objects and advantages thereof, will be best understood from the following description of specific embodiments with reference to the accompanying drawing.

Description of the preferred embodiments

Figure 1:
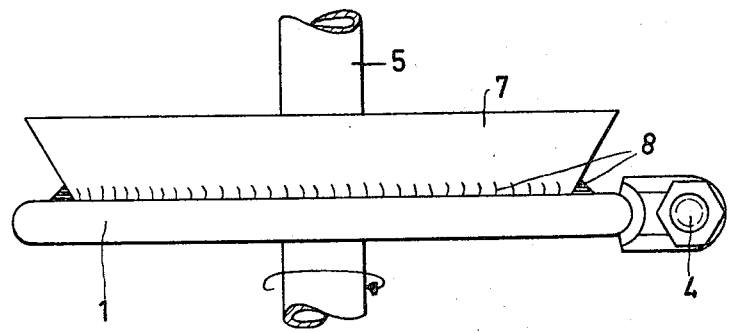
FIG. 1 is a side-elevational view of a filter element embodying my invention.

Discussing now the illustrated embodiment in more detail, it will be seen that the shaft 5 shown in FIG. 1 is rotatable in the direction of the arrow. That provision may be made for reversing this direction of rotation, if so desired, is self-evident.

Figure 2:
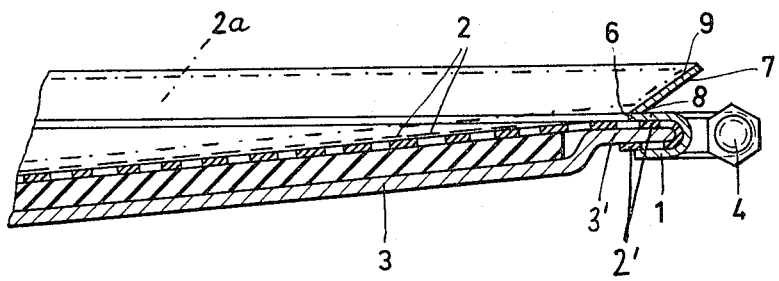
FIG. 2 is a fragmentary section through the embodiment shown in FIG. 1.

Shaft 5 carries, as more clearly shown in FIG. 2, a base plate 3 whose upper surface extends transversely of the shaft 5. It should be noted that, although in FIGURE 2 this upper surface is inwardly inclined toward the shaft 5, it could also extend in a plane normal to the same as illustrated in FIGURE 1 which is otherwise identical with FIGURE 2.

The base plate 3 is rigid with the shaft 5 for rotation therewith, and an exchangeable perforate supporting member 2, in form of a filter screen or the like, overlies the upper surface of the base plate 3. Preferably, the supporting member will be somewhat spaced from this upper surface to facilitate run-off of the filtrate between the two, for which purpose a suitable distancing means can be inserted between the two (as illustrated in FIG. 2).

A layer 2a of particulate filtering material is carried on the supporting member 2. The layer 2a, which is considerably thicker than the member 2 as evident from FIG. 2, is illustrated in the drawing in chain-lines because its showing in full lines might cause confusion. However, it is to be understood that the layer 2a is by no means an optional feature because it is shown in this manner.

The base plate 3 comprises a peripheral edge portion 3', and the supporting member 2 similarly comprises a peripheral edge portion 2'. FIG. 2 illustrates how I releasably connect these edge portions to one another so as to permit removal of the member 2 from the base plate 3 at any time. I provide for this purpose an annular connecting element 1 which extends circumferentially of the base plate 3 and the member 2. The ends of this element 1 overlap and a screw or bolt 4 acts upon these ends so as to increase or decrease this overlapping, depending upon the direction in which the screw or bolt 4 is rotated. It is not believed necessary to discuss this particular feature in more detail because the arrangement is analogous to that which can be found in any hose clamp. It may suffice to recall that rotation of the screw 4 in a sense increasing the overlap will radially constrict the element about the plate 3 and the member 2, whereas reversal of the rotation will result in reversal of this constriction.

FIG. 2 illustrates that the element 1 is hollow and of substantially U-shaped cross-section with the open side of the U-shape facing radially inwardly. The peripheral edges 2' and 3' are thus received in the interior of element 1 through this open side and it will be evident that radial constriction of the element—resulting from appropriate rotation of the screw 4—will clamp the edge 2' to the edge 3', firmly but releasably.

Confining of the layer 2a of particulate filtering material is effected by the element 1 which for this purpose comprises an upwardly and outwardly diverging confining portion 7. This confining portion 7 may be inherently integral with the remainder of the element 1, as it may be connected thereto in a suitable manner, for instance by a welded seam as indicated with reference numeral 8 in FIG. 2. The portion 7 is provided with an inner surface 9 which diverges upwardly and radially outwardly with reference to the member 2 as well as with respect to the remainder of the element 1.

It is clear from FIG. 2 that the height of the portion 7 is at least equal to the thickness of the layer 2a in the region of the peripheral edge 2' of the supporting member 2, so that the material of layer 2a is effectively confined by the surface 9 and prevented from disintegrating. As mentioned before, the liquid to be filtered is passed through the layer 2a for run-off between the member 2 and the base plate 3. While this is not shown it will be appreciated that the shaft 5 may be hollow and be provided with suitable apertures for the filtrate. During the course of such filtration, solid residue is retained in the material of layer 2a, and filtration may continue until the layer 2a has become clogged with this residue and will no longer permit proper fluid passage therethrough.

At this time the shaft 5 and the entire filter are rotated, and as a result of the upward and outward inclination of the surface 9, the material of layer 2a is able to slide over this surface 9 under the influence of centrifugal force, and is thereby ejected together with the entrapped residue.

If it is then necessary—or when it becomes necessary at another time—to remove the supporting member 2 for exchange against another, for cleaning or for repair, the element 1 with its portion 7 is simply released temporarily to be restored to its clamping and retaining position when the exchange, cleaning or repair have been effected.

It will be evident that modifications of the illustrated embodiment are readily possible without departing from the central inventive concept. For instance, the portion 7 need not necessarily be carried by the remainder of element 1 at the inner and upper edge thereof, as illustrated in FIG. 2. However, this arrangement is preferred because it eliminates nooks and corners in which portions of the particuate material or of the residue could be entrapped; obviously, reasons of hygiene make it necessary to prevent such a possibility.

It will be understood that each of the elements described above, or two or more together, may also find a useful application in other types of arrangements differing from the types described above.

While the invention has been illustrated and described as embodied in an alluvial filter, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the claims.

What is claimed as new and desired to be secured by Letters Patent is set forth in the appended claims.

I claim:

1. In a filter device of the type comprising a rotatable shaft, and at least one filter carried by said shaft for rotation therewith and including a base plate portion having a peripheral edge and an upper surface extending transversely of said shaft, a perforate supporting portion overlying said upper surface and also having a peripheral edge, and a layer of particulate filtering material carried by said supporting portion and through which a liquid is to be filtered, the improvement consisting in the provision of connecting means extending circumferentially of said portions releasably connecting said peripheral edges thereof and operative for confining said particulate filtering material during filtration of the liquid while permitting subsequent automatic centrifugal ejection of said filtering material and solid fraction retained therein in response to rotation of said shaft.

2. In a filter device as defined in claim 1, wherein said connecting means comprises an annular clamping element.

3. In a filter device as defined in claim 2, wherein said annular element comprises an annular confining portion projecting upwardly beyond said supporting portion and having an inner surface which diverges upwardly and outwardly with respect to said supporting portion.

4. In a filter device as defined in claim 3, wherein said confining portion is integral with said annular element.

5. In a filter device as defined in claim 3, wherein said confining portion is carried by said annular element.

6. In a filter device as defined in claim 3, wherein said confining portion is welded to said annular element.

7. In a filter device as defined in claim 3, wherein said layer of particulate filtering material has a predetermined thickness, and wherein said confining portion projects upwardly beyond said supporting portion by at least said predetermined thickness.

8. In a filter device as defined in claim 1, wherein said connecting means comprises a hollow annular element having an open side facing radially inwardly and adapted to clampingly receive said peripheral edges of said portions.

References Cited

UNITED STATES PATENTS

| | | | |
|---|---|---|---|
| 3,033,373 | 5/1962 | Mueller | 210—344 |
| 3,292,791 | 12/1966 | Müller | 210—330 |
| 3,356,219 | 12/1967 | Müller | 210—344 X |

SAMIH N. ZAHARNA, *Primary Examiner.*